April 13, 1926. 1,580,823
F. H. GLEASON
MEANS FOR LUBRICATING AUTOMOBILES
Filed Jan. 18, 1921  2 Sheets-Sheet 2
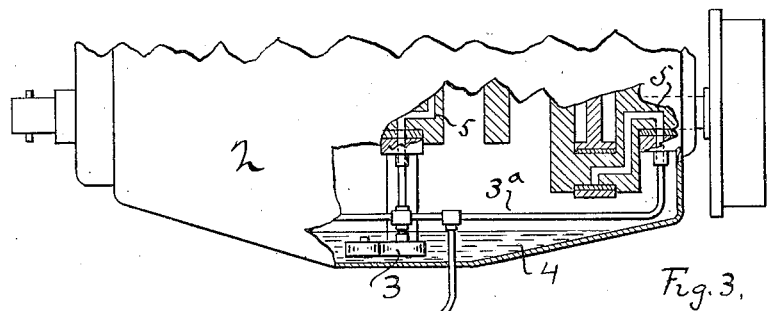
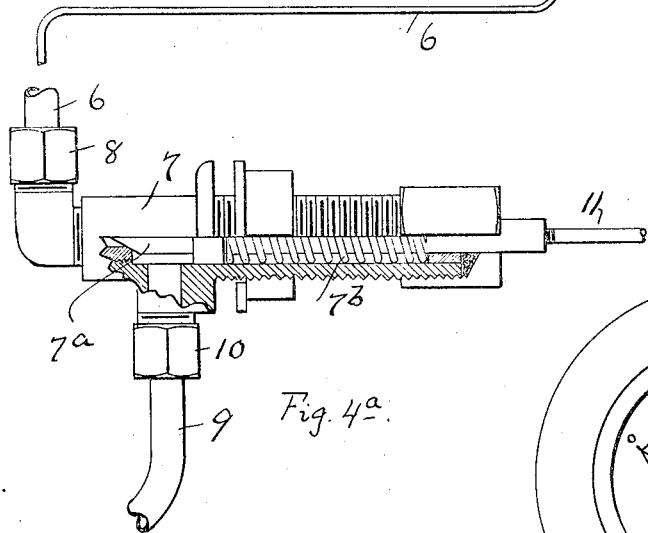
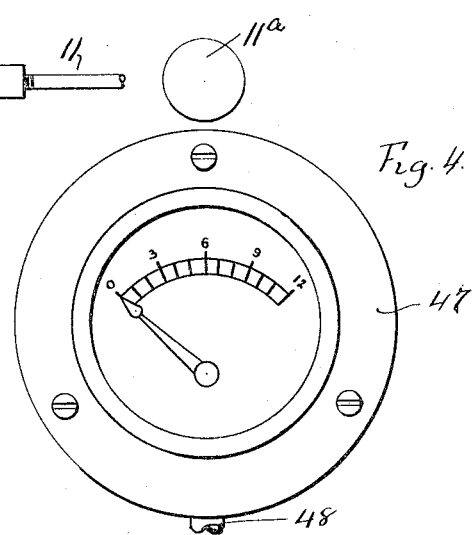
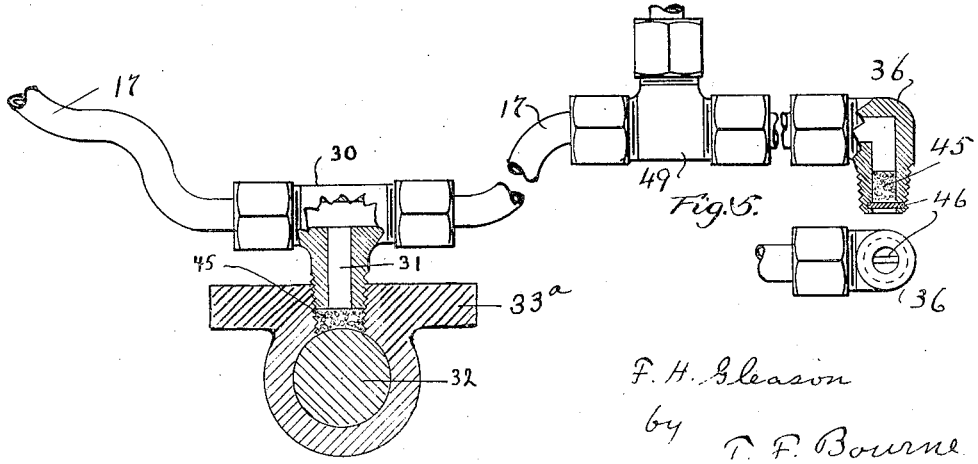
F. H. Gleason
by T. F. Bourne Patented Apr. 13, 1926.

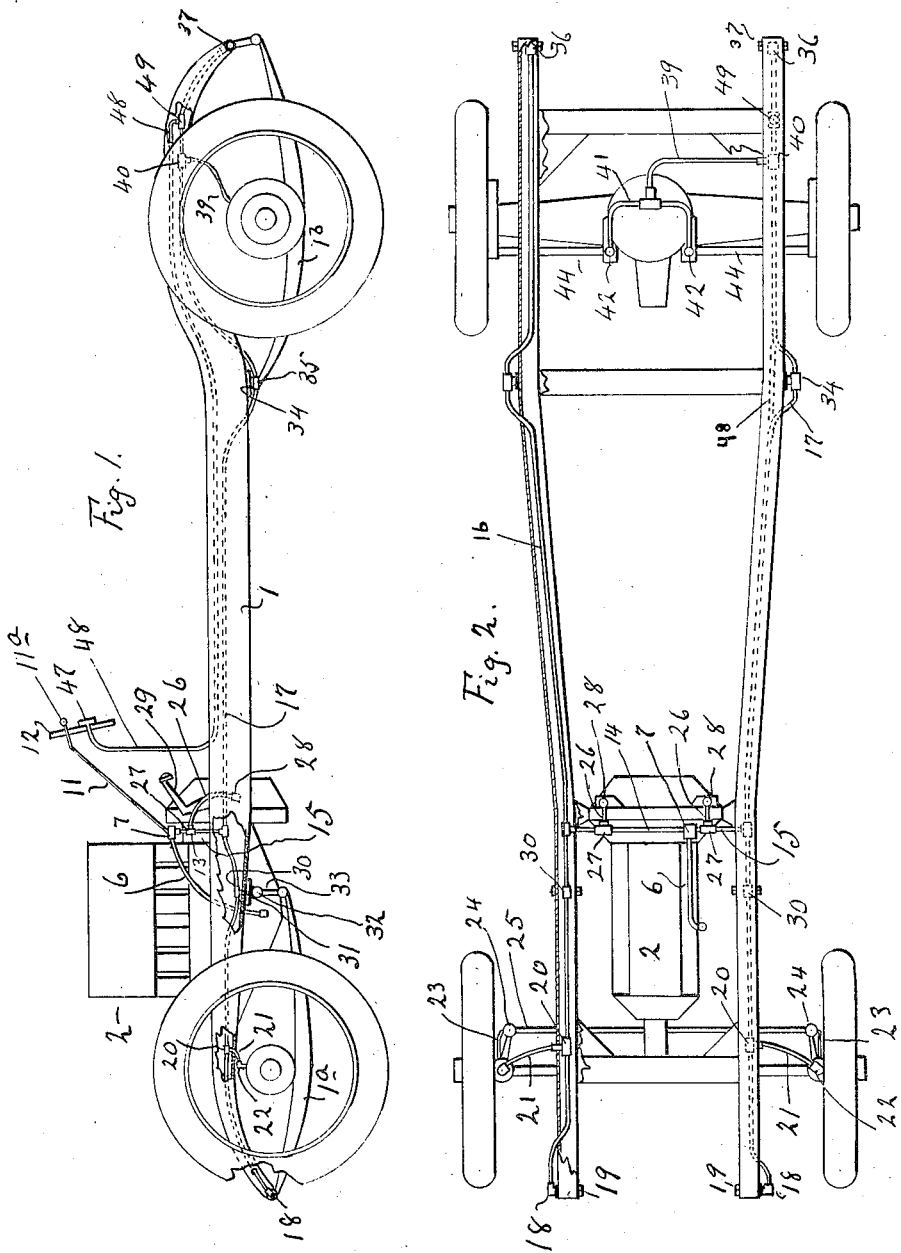

1,580,823

UNITED STATES PATENT OFFICE.

FREDERICK H. GLEASON, OF NEW YORK, N. Y.

MEANS FOR LUBRICATING AUTOMOBILES.

Application filed January 18, 1921. Serial No. 438,063.

*To all whom it may concern:*

Be it known that I, FREDERICK H. GLEASON, a citizen of the United States, and resident of New York city, borough of Manhattan, in the county of New York and State of New York, have invented certain new and useful Improvements in Means for Lubricating Automobiles, of which the following is a specification.

The object of my invention is to provide means for lubricating the bearings of the chassis of an automobile or motor vehicle as well as the bearings of the engine thereof in such a manner that while the engine bearings will be constantly lubricated from a source of lubricant the oil for lubricating the bearings of the chassis may be taken under pressure, at will, from the same source that supplies the engine bearings to charge the chassis lubricating system with oil, the arrangement being such that after said system has been charged the oil may feed by gravity to the chassis bearings.

In carrying out my invention the engine of the automobile or motor vehicle chassis is provided with a pump operated by the motor continuously to supply the motor bearings with oil for lubricating purposes, and tubing is attached to the chassis frame and connected with said pump, a manually operated valve being included in the tubing system to control the flow of oil from the pump to the tubing at will, said tubing being connected with various bearings of the chassis to be lubricated, means being provided at each bearing to prevent the free flow of oil thereto under pressure and to permit the gradual feeding of oil to the bearings by gravity from the charge in the tubing.

My invention also comprises novel details of improvement that will be more fully hereinafter set forth, and then pointed out in the claims.

Reference is to be had to the accompanying drawings forming part hereof, wherein Figure 1 is a partly broken side view of an automobile chassis embodying my invention; Fig. 2 is a plan view; Fig. 3 is an enlarged detail sectional view of a portion of the motor or engine of the automobile; Fig. 4 is a partly sectional view, enlarged, of part of the lubricating system; Fig. 4ᵃ is a partly sectional detail; Fig. 5 is a detail view.

Similar numerals of reference indicate corresponding parts in the several views.

The main frame of the chassis of the automobile or motor vehicle is indicated at 1, of any desired construction, and at 2 is the motor or engine carried by the said frame in any suitable or usual manner. The motor is provided with an oil pump 3 to be operated continuously by the motor in any well known manner to pump oil from the oil receptacle 4 of the motor to the bearings 5 of the crank-shaft and other desired motor parts under pressure, the excess oil running back into receptacle 4. From the pump or from pipe 3ᵃ leading therefrom, as indicated in Fig. 3, I extend a tube or conduit 6 to supply oil under pressure from pump 3 to the bearings of the chassis. A manually controlled valve 7 is connected with tube 6 by any suitable connection 8 to receive oil from the pump, and said valve is connected with an outlet tube or conduit 9 by any suitable connection 10. The valve 7 is shown provided with a tapering valve 7ᵃ pressed to its seat by a spring 7ᵇ to control the flow of oil through the valve. Said valve may be secured to any part of the chassis, such as to the dash thereof. Valve 7ᵃ may be operated by means of a rod or wire 11 extending from said member in convenient position to the driver, as by having a button 11ᵃ exposed at the cowl board or dash 12, whereby when the valve member is operated oil under pressure from the motor pump may be delivered through the valve. Tube 9 is connected with a system of piping carried by the chassis to supply the bearings of the latter with oil. I have shown tube 9 connected with a fitting 13 from which branch tubes 14, 15, extend transversely of the chassis and are respectively connected to tubing 16, 17, that extend along the side members of frame 1 and which may be secured thereto at intervals in any suitable manner, such as by well known clips. The tubing 16, 17, is connected to the various bearings to be lubricated. Tubing 16, 17, may be connected by elbows or other suitable fittings 18 to the front spring bolts 19 of the chassis, and by means of T-fittings 20, and flexible tubing 21 to the bolts of the steering knuckles by means of fittings or elbows 22. Tubes 23 may extend from the bolts of the steering knuckles to the joints 24 between the steering knuckles and the tie-rod or drag-link 25. Tubes 14, 15, are connected by tubes 26, T-fittings 27, and suitable fittings 28 with the clutch throwout and brake levers 29 at their bearings. The tubes 16, 17, may be connected by suitable fittings 30, bore 31 and corresponding fittings at the bolts 32 supported by brackets 33ª of the shackles 33 of the front springs 1ª. The tubing by means of fittings 34 may be connected to the bolts 35 at the forward ends of the rear springs 1ᵇ. Tubing 16, 17, terminate at the outer ends of the rear springs by means of fittings 36, fitted to the bearings of the rear spring shackles or the like, at the bolts 37, Fig. 4. A branch tube 39 is shown extended from tube 17 by means of T-fittings 40 to branch tubing 41, connected by fittings 42, with the bearings 43 of brake shafts 44. At each of the fittings that connects to a bearing, or at the bearing communicating with such fitting, I provide a capillary member, such as a plug or disc 45, (Figs. 4 and 5), to resist the free flow of oil from the chassis lubricating system under pressure and to permit the feeding or percolating of the oil to the corresponding bearing by gravity when the pressure from the pump is removed from the lubricating system of the chassis. The members 45 may be of felt or other suitable fibrous material that will permit the feeding of the oil. Where the member 45 is in the form of a plug in the fitting, such as in elbow 36, (Fig. 4), I preferably insert a pin 46 in the elbow to prevent the plug from being forced from the fitting by the oil pressure in the system. The capillary member 45 in the form of a disc may be between the fitting and a shaft or bolt, as indicated in the bearing 33ª in Fig. 5, against which the fitting 30 is opposed. At each of the fittings at the several bearings the supply tubing, or the branches therefrom, are disposed in the form of a sump so that each bearing will be at a point lower than the main portion of the supply tubing 16, 17, to feed to the corresponding bearing by gravity when the pressure of the oil from the pump is removed. The capillary members will feed the oil to the bearings by gravity from the several sumps and will prevent the excessive flow of oil when the system is under pressure from the pump.

In order to determine that the lubricating system of the chassis is fully under pressure when valve 7 is open I provide a gage 47 connected by tube 48 with a T or other fitting 49 in the main tube line, such as 17, at a point remote from the pump and near the terminal point of the tubing, such as adjacent to the rear bearing 37 to be lubricated. Said gage may be maintained in any desired position convenient for observation, such as upon the dash or cowl board 12 of the chassis.

During usual operation of the motor the valve 7 will be closed and the pump 3 will be operated continuously by the motor to supply the motor bearings with the lubricant. When it is desired to supply the chassis lubricating system with oil the valve 7 is opened so that the pump 3 will charge the system with oil from the same source 4 that the motor is supplied and at the same time. The operator will observe the gage 47 while valve 7 is open and when the gage shows the desired pressure in the chassis lubricating system the valve will be closed. The capillary members 45 retain oil in the tubing and connections of the lubricating system of the chassis. Thereafter, the oil retained in said named system will be fed by gravity through the capillary members 45 to the various bearings. Whenever the operator desires to replenish the chassis lubricating system with oil it is merely necessary to open valve 7 for a short period as described, so that it may be said that the motor bearings are supplied with lubricant continually during operation of the motor while the lubricating system of the chassis may be supplied intermittently or at will with lubricant under pressure from the same source and from the same pump as supplies the motor bearings, since the resistance of the members 45 to the flow of oil in the tubing will create pressure in the latter to be indicated by gage 47.

While I have enumerated a number of the various bearings of an automobile chassis to be lubricated it will be understood that there may be other bearings to be lubricated, according to the make of the vehicle, not herein specifically referred to, but which may be connected by suitable fittings, as in the manner described, to the main supply tubes 16, 17, of the system.

Specific means for lubricating steering knuckles and for lubricating shackles of the main springs of motor vehicles' chasses are not set forth herein as they form part of companion applications filed herewith.

Having now described my invention, what I claim is:—

1. In a lubricating device for the chassis bearings of an automobile, an oil distributing system comprising a conduit connected with a plurality of bearings, and a second conduit connected with the first mentioned conduit, means to maintain oil under pressure in said second conduit, and a normally closed valve to control the flow of oil from said second conduit to said first mentioned conduit.

2. In a lubricating device for the chassis bearings of an automobile, a distributing conduit leading to a plurality of bearings, means to supply oil under pressure to said conduit, a normally closed valve interposed in said conduit between said means and said bearing and means under the control of the operator for opening said valve to admit oil simultaneously to said plurality of bearings.

3. In a lubricating device for the chassis bearings of an automobile, the combination with a pressure lubricating system for the engine bearings, of an oil distributing system connected with said pressure system and leading to a plurality of bearings, and manually operated means to control the connection between said pressure system and said distributing system.

4. The combination in an automobile of an engine having bearings requiring continuous lubrication when in use, and a chassis having bearings requiring intermittent lubrication, of a continuously operating pressure lubricating system for the engine-bearings in which lubricant is forced to the bearings under pressure at all times during engine operation, a main intermediate pipe having one end connected to the pressure lubricating system for the engine bearings, and in which lubricant is at all times maintained under pressure, and a chassis lubricating system including a plurality of tubes leading to respective bearings and all in communication with the other end of the intermediate pipe for conveying lubricant from the intermediate pipe to the respective bearings under pressure, and a valve in the intermediate pipe controlling communication between the engine lubricating system and said chassis lubricating system, whereby an intermittent lubrication of the chassis bearings under pressure may be effected.

5. The combination in an automobile of an engine having bearings requiring continuous lubrication when in use, and a chassis having bearings requiring intermittent lubrication, of a continuously operating pressure lubricating system for the engine-bearings in which lubricant is forced to the bearings under pressure at all times during engine operation, a main intermediate pipe having one end connected to the pressure lubricating system for the engine bearings, and in which lubricant is at all times maintained under pressure, and a chassis lubricating system including a plurality of tubes leading to respective bearings and all in communication with the other end of the intermediate pipe for conveying lubricant from the intermediate pipe to the respective bearings under pressure, a valve in the intermediate pipe controlling communication between the engine lubricating system and said chassis lubricating system, whereby an intermittent lubrication of the chassis bearings under pressure may be effected, and means in the tubing connections adjacent the bearings to restrict the free flow of lubricant when under pressure.

Signed at New York city, in the county of New York, and State of New York, this 14th day of January, A. D. 1921.

FREDERICK H. GLEASON.